United States Patent [19]
Prater

[11] Patent Number: 6,058,591
[45] Date of Patent: May 9, 2000

[54] CLUTCH DRUM AND METHOD OF MANUFACTURE

[75] Inventor: Ronald E. Prater, Rochester, Mich.

[73] Assignee: Koppy Corporation, Orion, Mich.

[21] Appl. No.: 09/262,406

[22] Filed: Mar. 4, 1999

Related U.S. Application Data

[62] Division of application No. 08/816,811, Mar. 19, 1997, Pat. No. 5,881,856.

[51] Int. Cl.[7] ....................................................... B23P 13/04
[52] U.S. Cl. .............................. 29/558; 29/897.2; 192/70; 192/70.2; 403/359; 74/431; 228/176; 72/353
[58] Field of Search ....................... 192/70, 70.2; 72/353; 74/431; 403/359; 228/176; 29/558, 897.2

[56] References Cited

U.S. PATENT DOCUMENTS

| | | |
|---|---|---|
| 3,599,512 | 8/1971 | Wayman . |
| 3,747,727 | 7/1973 | Dach et al. . |
| 3,780,601 | 12/1973 | Dach et al. . |
| 3,841,452 | 10/1974 | Newsock et al. . |
| 3,922,932 | 12/1975 | Maurice et al. . |
| 4,014,619 | 3/1977 | Good et al. . |
| 4,089,097 | 5/1978 | Good et al. . |
| 4,640,294 | 2/1987 | Ordo . |
| 4,699,259 | 10/1987 | McColl . |
| 4,706,789 | 11/1987 | McColl et al. . |
| 4,716,756 | 1/1988 | Fujioka et al. . |
| 4,813,522 | 3/1989 | Fujioka et al. . |
| 4,945,782 | 8/1990 | Farrell . |
| 4,997,073 | 3/1991 | Fujioka et al. . |
| 5,069,575 | 12/1991 | Anderson . |
| 5,078,536 | 1/1992 | Anderson . |
| 5,180,043 | 1/1993 | Walker . |
| 5,305,943 | 4/1994 | Walker . |
| 5,570,767 | 11/1996 | Lauscher . |

Primary Examiner—Irene Cuda
Assistant Examiner—Anthony L. Green
Attorney, Agent, or Firm—Howard & Howard

[57] ABSTRACT

A clutch drum is formed from a single piece of material. The clutch drum includes an inner surface having a plurality of spline portions interspersed with inner wall spaces. Each spline portion includes at least one slot to form at least one snap ring groove within the clutch drum. The outer surface of the clutch drum is smooth and continuous and adapted to receive a brake band. The clutch drum does not include any perforations or breaks through the single piece of material forming the cylindrical portion of the clutch drum.

10 Claims, 3 Drawing Sheets

6,058,591

CLUTCH DRUM AND METHOD OF MANUFACTURE

This is a divisional of application Ser. No. 08/816,811 filed Mar. 19, 1997, and is now U.S. Pat. No. 5,881,856, which issued on Mar. 16, 1999.

BACKGROUND OF THE INVENTION

This invention genarally relates to a clutch drum for use in vehicle transmissions and a method of manufacturing the clutch drum.

Vehicle transmissions typically include a clutch for engaging an engine output shaft to the gear box of the transmission. Typical clutches include a series of clutch plates that are housed within a clutch drum. A variety of clutch drums are known. One feature of most clutch drums is the use of a snap ring to maintain the clutch plates within the clutch drum while also allowing the clutch plates to be moved axially within the clutch drum as needed.

A variety of attempts at making clutch drums that include snap rings have been used. In most arrangements, the clutch drum includes a series of splines defined by interspaced inward and outward projections on the clutch drum. A snap ring groove is typically provided by punching through the inwardly protruding spline portions to thereby break the continuity of the spline and form a groove to receive the snap ring. In order to complete a clutch drum with such an arrangement, an outer housing portion must be attached to provide a smooth outer surface that is adapted to receive a brake band.

While the known arrangements have proven useful, they are not without disadvantages and shortcomings. One problem associated with typical clutch drums is that forming the groove to receive the snap ring results in weakening the material in the area of the groove so that the clutch drum may fail under certain conditions. Another problem is that requiring a separate outer housing introduces additional material and manufacturing processes and time.

Accordingly, it is desirable to provide a clutch drum having better strength characteristics than has been achieved in the prior art. Further, it is desirable to provide a clutch drum that can be manufactured more economically. This invention addresses both of those needs.

SUMMARY OF THE INVENTION

This invention is a clutch drum formed from a single piece of material having a series of splines that project inward toward a center of the drum. The same piece of material has a smooth outer surface with a continuous, unbroken outer diameter. Each of the spline portions includes a slot that, together with slots in the other spline portions, forms a groove for receiving a snap ring. Importantly, the snap ring groove is accomplished without any breaks or perforations through the single piece of material.

A clutch drum designed according to this invention, therefore, overcomes the shortcomings of the prior art in that it does not require two separate pieces and it substantially reduces the possibility for the material to fail in use because it does not include the perforations that would otherwise weaken the material in the area of the snap ring groove.

The preferred method of manufacturing a clutch drum according to this invention is performed in four basic steps. First, a generally cylindrical portion is formed from a single piece of material. The generally cylindrical portion includes an inner wall and an outer wall. A plurality of spline portions that extend radially inward from the inner wall are then formed on the generally cylindrical portion, preferably by a flow forming process. The spline portions are arcuately spaced along the inside of the cylindrical portion so that there are inner wall spaces interspersed between and among the spline portions. Next, a slot is formed in each spline portion by deforming a portion of the material along the length of each spline. More specifically, the material is deformed in a radially outward direction without breaking through the outer wall of the cylindrical portion. This deformation results in a bump on the outer wall surface of the cylindrical portion that is coincident with each slot formed in the spline portions. The last step of the inventive method is to smooth the surface of the outer wall so that the cylindrical portion has a continuous, unbroken outer diameter that is adapted to receive a break band.

The various features and advantages of this invention will become apparent to those skilled in the art from the following detailed description of the presently preferred embodiment. The drawings that accompany the detailed description can be described as follows:

DETAILED DESCRIPTION OF THE PREFERRED EMBODIMENT

Figure 1:
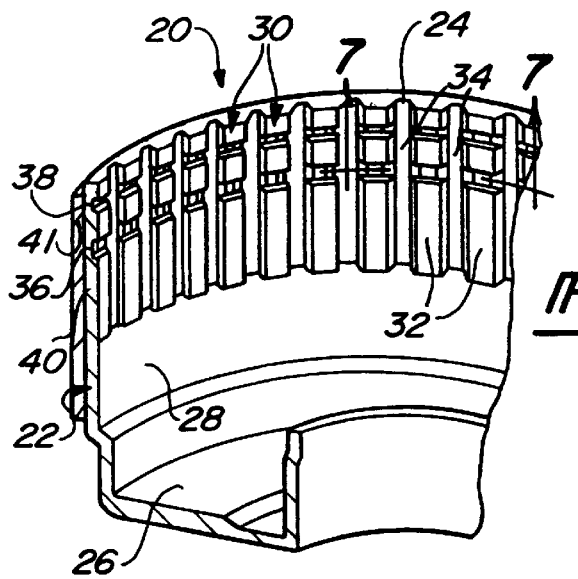
FIG. 1 is a perspective view of a portion of a clutch drum designed according to this invention.

FIG. 1 illustrates a portion of a clutch drum 20 designed according to this invention. The clutch drum 20 includes a cylindrical portion 22. The cylindrical portion 22 extends between an open end 24 of the clutch drum and a central, plate portion 26. The cylindrical portion 22 includes an inner surface 28.

A plurality of splines 30 are formed on the inner surface 28. The splines 30 preferably are formed using a conventional flow forming process. Each spline 30 preferably has the same radial thickness so that an interface 32 on each spline portion 30 is maintained at the same inner diameter. The spline portions 30 are spaced along the inner surface 28. A plurality of inner wall spaces 34 are interspersed between the spline portions 30. The inner wall spaces 34 preferably are all maintained at a second inner diameter that is greater than the first inner diameter defined by the inward faces 32 on the spline portions 30.

In the illustrated embodiment, each spline portion 30 includes a first slot 36 and a second slot 38. The slots 36 and 38 preferably are aligned axially on the cylindrical portion 22 so that the plurality of the slots 36 form one snap ring groove and the plurality of slots 38 form a second snap ring groove. Snap rings are placed within the grooves to maintain clutch plates within the clutch drum in a manner that is understood by those skilled in the art.

The illustrated clutch drum 20 includes a smooth outer surface 40. A brake band (shown schematically in FIGS. 1 and 7), as required in most transmission applications, is received over the outer surface 40 as will be understood by those skilled in the art. Importantly, the clutch drum 20 includes the smooth outer surface 40 so that a separate outer casing is not required to combine the clutch drum 20 with a brake band. In the prior art, separate pieces were used to define the spline portion of a clutch drum and the outer casing, respectively. This invention presents a significant improvement over such designs in that a single piece of material, preferably metal, is used to form the clutch drum 20.

Figure 2:
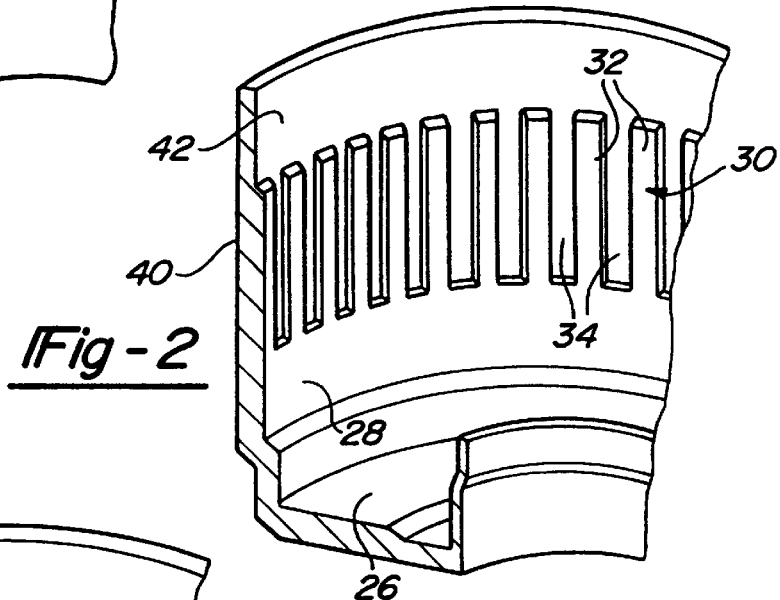
FIG. 2 is a perspective view of a portion of a piece of material to be formed into a clutch drum according to this invention at an early stage of the process.

FIG. 2 illustrates a piece of material to be formed into the clutch drum 20 at an early stage of the process. At the point of the process illustrated in FIG. 2, the clutch drum has the spline portions 30 formed on the inner surface 28 of the cylindrical portion 22. The outer surface 40' has not been machined to be smooth, yet. Further, additional material 42 is present adjacent a terminal end on the spline portions 30. As illustrated in FIG. 2, the slots 36 and 38 have not yet been formed in the spline portions 30.

Figure 3:
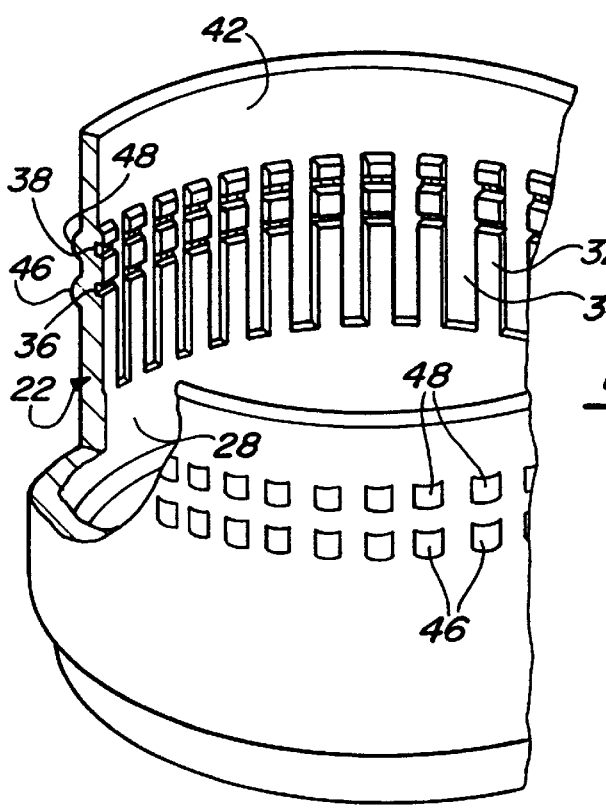
FIG. 3 is a perspective view of a later stage in the manufacturing process.

FIG. 3 illustrates the piece of material from FIG. 2 at a later stage in the process of manufacturing a clutch drum according to this invention. FIG. 3 illustrates the material immediately after the slots 36 and 38 have been formed in the spline portions 30. The preferred method of forming the slots 36 and 38 is by deforming the material in a radially outward direction in a manner to be described in more detail below. When the slots 36 are formed, bumps 46 result on the outer surface of the piece of material. Similarly, a plurality of bumps 48 result from the formation of the slots 38. The bumps 46 and 48 are formed on the outer surface of the piece of material because a portion of the material of the spline portions 30 has been deformed in a radially outward direction. The bumps 46 and 48 are later machined off of the outer surface 40' to form the smooth outer surface 40 of the clutch drum 20. A machining process to smooth the outer surface of the clutch drum 20 can be any conventional process as understood by those skilled in the art.

Figure 4:
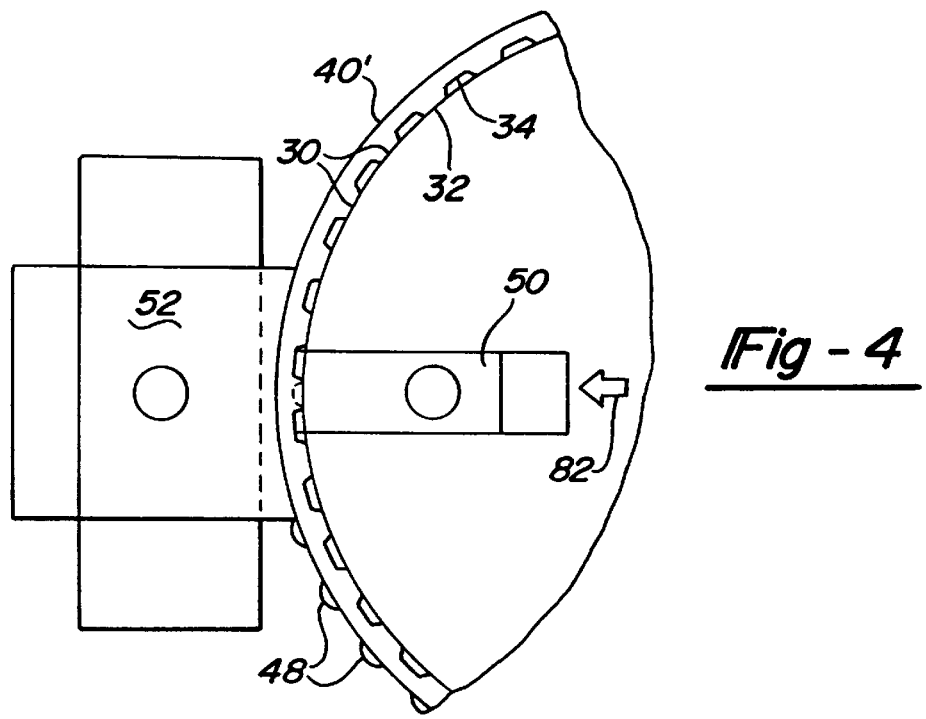
FIG. 4 is a top elevational view of a tool forming slots in the spline portions of a clutch drum according to this invention.

FIG. 4 schematically illustrates machinery for performing the method of this invention. A tool 50 is used to deform the material in the spline portions 30 to form the slots 36 and 38. A support 52 is located on the outer edge of the surface 40' to brace the material so that a circular configuration of the clutch drum is maintained and only the selected portions of the spline portions 30 are deformed to form the slots 36 and 38. In the illustration of FIG. 4, the tool 50 is adapted to form the slots 36 and 38 in one spline portion 30. The tool 50 is moved radially inward and outward (i.e., left and right according to the drawing) to engage a properly positioned spline portion 30 when forming the slots 36 and 38. Preferably, the material forming the clutch drum 20 is moved in a circular pattern (counterclockwise according to the drawing) and indexed so that the tool 50 can sequentially engage the selected spline portions to form the slots. Although the tool 50 is illustrated forming slots in a single spline at one time, the tool 50 can be modified to form slots in two splines at one time, for example.

Figure 5:
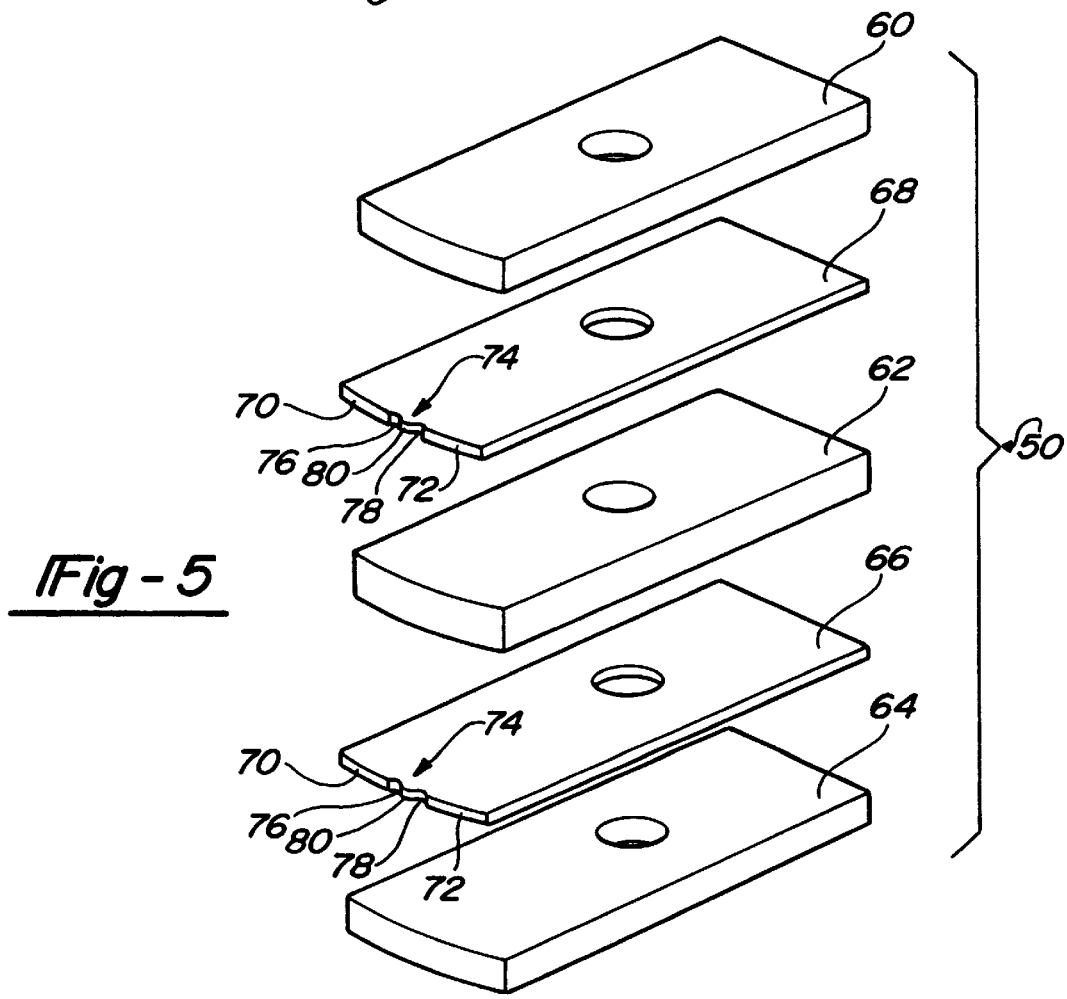
FIG. 5 is a perspective, exploded view of a slot-forming tool used according to this invention.
Figure 6:
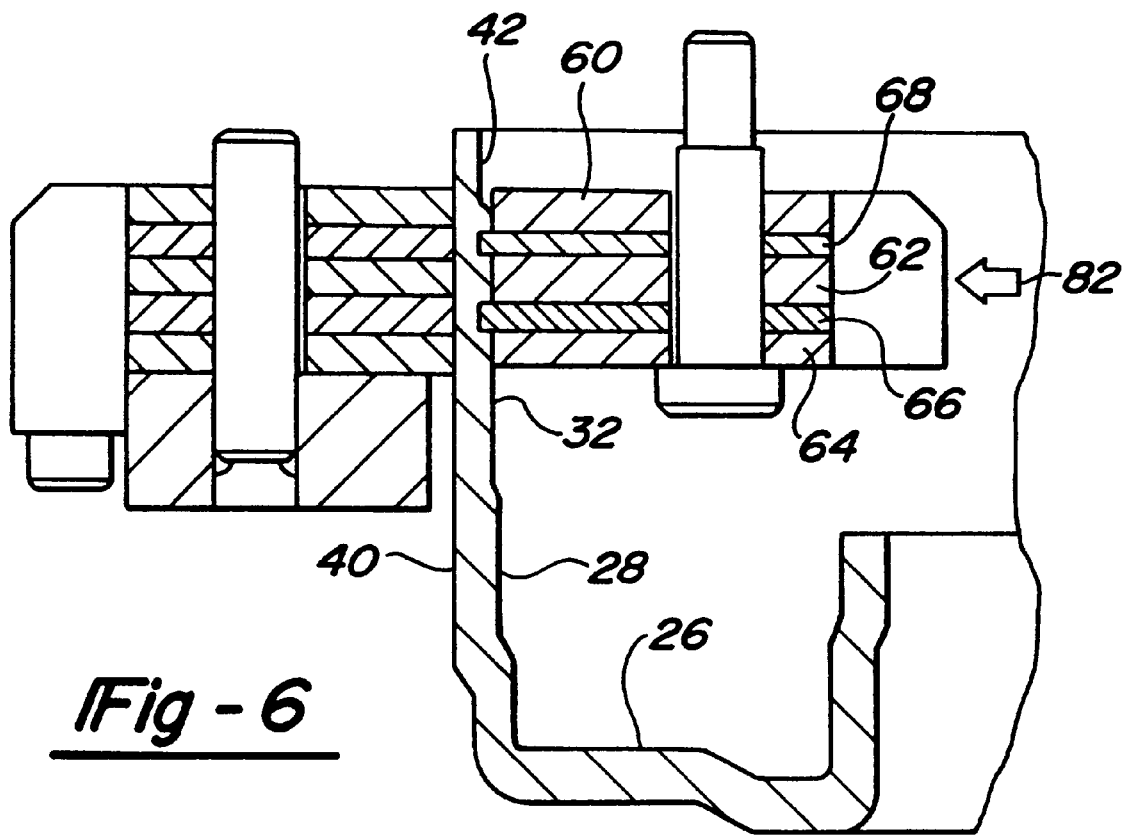
FIG. 6 is a partial cross-sectional, side elevational view of a portion of the process according to this invention.

FIGS. 5 and 6 illustrate, in more detail, a presently preferred embodiment of the tool 50. Three bracing plates 60, 62 and 64 sandwich two cutter plates 66 and 68. The forward end of the cutting plates 66 and 68 preferably extend radially outward from the forward end of the bracing plates 60, 62 and 64 as is best seen in FIG. 6.

The forward end of each of the cutting plates includes two inner wall space embracing portions 70 and 72. The portions 70 and 72 engage the inner wall spaces 34 adjacent a selected spline portion 30 on either side. A cutting portion 74 engages the material forming the spline portion 30. The cutting portion 74 includes two knurling edges 76 and 78. The knurling edges 76 and 78 and the inner wall space embracing portions 70 and 72 cooperate to prevent any deformation of the spline portion material from moving outward into the inner wall space during the slot-forming portion of the inventive method. A central projection 80 extends outward between the two knurling points 76 and 78 for forming the slots 36 and 38 in the spline portions 30.

As the material forming the clutch drum is indexed through the machinery used to accomplish the method of this invention, the tool 50 is sequentially moved radially outward against the inner surface 28 of the cylindrical portion 22 according to the arrow 82 (illustrated in FIGS. 4 and 6). The incident force of the tool 50 against the inner surface 28 is effective to form the slots 36 and 38 in the spline portions 30. This results in the deformation of the material so that the bumps 46 and 48 are formed on the outer surface 40' of the cylindrical portion 22. The inner wall engaging portions 70 and 72 prevent the deformation of any of the spline portion material from disrupting the inner diameter defined by the inner wall spaces 34. In the most preferred embodiment, the slot formation is accomplished without perforating or breaking through the cylindrical portion 22.

After the material has been indexed through a complete 360° rotation and all spline portions have received an appropriate number of slots, which is two in the illustrated embodiment, then the material portion 42 is removed by a conventional cutting process and the outer surface 40 is machined to achieve a continuous, smooth outer surface that is adapted to receive a brake band.

Figure 7:
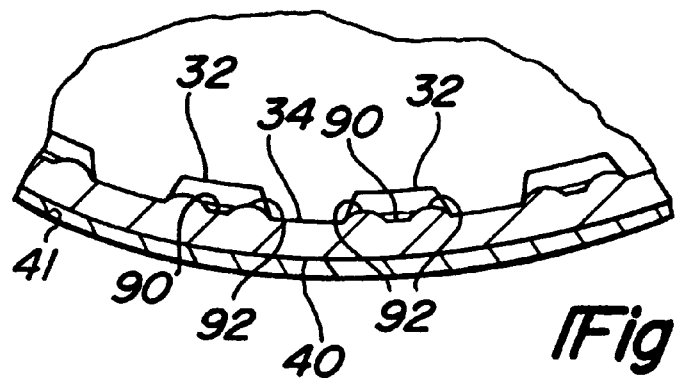
FIG. 7 is a cross-sectional view showing details of the slots that make up the snap ring-receiving groove in a clutch drum designed according to this invention.

FIG. 7 illustrates, in cross-sectional view, more details of the preferred configuration of the slots 36 and 38. The central portion 80 of the tool cutting plates 66 and 68 causes a central portion 90 to be formed in the slots 36 and 38. The central portion 90 has a knurled portion 92 on each side extending between the central portion 90 and an edge of the slot. The edge of the slots preferably are defined at an intersecting point between the spline portions 30 and the inner wall spaces 34, which is ensured by the knurling edges 76 and 78 in the cutting plates 66 and 68. The view in FIG. 7 shows the cross-sectional view of a radially oriented face of each slot. Each slot can be considered to have a first, radially oriented, face and two, axially oriented and opposing faces, extending between the first slot face and the inward face 32 on the spline portion. In the most preferred embodiment, the first slot is aligned with the inner diameter defined by the inner wall spaces 34.

A clutch drum designed according to this invention and manufactured using the method of this invention provides significant improvements over the prior art. This invention provides the ability to reduce the amount of material required, the number of parts included, the complexity of the manufacturing process and the amount of labor involved compared to prior clutch drum designs. Moreover, the ability to make a clutch drum from a single piece of material without any perforations or breaks in the material results in a clutch drum that has greater durability and higher material strength characteristics.

The preceding description is exemplary rather than limiting in nature. Variations and modifications to the disclosed embodiment may become apparent to those skilled in the art that do not necessarily depart from the purview and spirit of this invention. Accordingly, the legal scope of protection afforded this invention can only be determined by studying the following claims.

What is claimed is:

1. A method of forming a clutch drum comprising the steps of:

(A) forming a generally cylindrical portion from a single piece of material such that the cylindrical portion has an inner wall and an outer wall;

(B) forming a plurality of spline portions extending radially inward from said inner wall such that the spline portions are arcuately spaced by interspersed inner wall spaces;

(C) forming a slot in each spline portion by deforming a portion of the material along each spline portion radially outward without perforating the cylindrical portion.

2. The method of claim 1, wherein step (B) is performed by flow forming the plurality of spline portions.

3. The method of claim 1, wherein step (C) is performed by using a radially moving press tool and pressing the tool into the material in a radially outward direction at the location of a desired slot while simultaneously preventing any of the material from extending arcuately outward into an adjacent inner wall space.

4. The method of claim 3, wherein step (C) is performed by the further substep of bracing a portion of the outer surface that is radially aligned with the location of the desired slot.

5. The method of claim 3, wherein step (C) is performed by forming two slots in each spline portion, simultaneously.

6. The method of claim 3, wherein step (C) is performed by forming a slot in two adjacent spline portions, simultaneously.

7. The method of claim 1, wherein step (C) includes forming a bump in the outer wall of the cylindrical portion at a location corresponding to each formed slot and machining the outer wall after performing step (C) to thereby remove the bump.

8. The method of claim 7, wherein the machining is performed using a lathe.

9. The method of claim 7, wherein the machining is performed using a grinder.

10. The method of claim 1, wherein step (C) includes deforming a portion of the material radially outward on the outer wall and including subsequently smoothing the outer wall such that the cylindrical portion has a continuous and unbroken outer diameter.

* * * * *